United States Patent
Mendel et al.

(10) Patent No.: US 9,250,859 B2
(45) Date of Patent: Feb. 2, 2016

(54) DETERMINISTIC FIFO BUFFER

(71) Applicant: ALTERA CORPORATION, San Jose, CA (US)

(72) Inventors: David W. Mendel, Sunnyvale, CA (US); Dana How, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/158,439

(22) Filed: Jan. 17, 2014

(65) Prior Publication Data

US 2015/0205579 A1    Jul. 23, 2015

(51) Int. Cl.
| | |
|---|---|
| *G06F 3/00* | (2006.01) |
| *G06F 5/00* | (2006.01) |
| *G06F 5/14* | (2006.01) |
| *G06F 5/12* | (2006.01) |

(52) U.S. Cl.
CPC .. *G06F 5/14* (2013.01); *G06F 5/12* (2013.01); *G06F 2205/061* (2013.01)

(58) Field of Classification Search
None
See application file for complete search history.

(56) References Cited

U.S. PATENT DOCUMENTS

| | | | | |
|---|---|---|---|---|
| 5,367,200 | A * | 11/1994 | Leonida | 327/33 |
| 5,471,583 | A * | 11/1995 | Au et al. | 710/57 |
| 5,555,524 | A * | 9/1996 | Castellano | 365/221 |
| 5,859,980 | A * | 1/1999 | Kalkunte | 709/232 |
| 5,898,893 | A * | 4/1999 | Alfke | 710/57 |
| 6,043,686 | A * | 3/2000 | Hashimoto et al. | 327/73 |
| 6,694,410 | B1 * | 2/2004 | Dang | 711/147 |
| 6,952,791 | B2 * | 10/2005 | Keller et al. | 713/503 |
| 7,145,974 | B2 * | 12/2006 | Hwang | 375/372 |
| 7,395,303 | B2 * | 7/2008 | Weiberle et al. | 708/671 |
| 7,636,834 | B2 * | 12/2009 | Tang et al. | 711/219 |
| 2008/0120445 | A1 * | 5/2008 | Jang et al. | 710/52 |
| 2011/0153963 | A1 * | 6/2011 | Chen et al. | 711/159 |

OTHER PUBLICATIONS

IEEE Standard for a Precision Clock Synchronization Protocol for Networked Measurement and Control Systems, Jul. 24, 2008, 289 pages, IEEE Std 1588-2008 (Revision of IEEE Std 1588-2002).
Pedro Moreira, et al. "White Rabbit: Sub-Nanosecond Timing Distribution over Ethernet", Oct. 12-16, 2009, pp. 58-62, ISPCS 2009 International IEEE Symposium on Precision Clock Syncronization for Measurement, Control and Communication, Brescia, Italy.
Altera—CPRI MegaCore Function User Guide, Jun. 2012, 11 pages, Altera Corporation, San Jose, CA.
IEEE std. 802.3ba-2010 (Amendment to IEEEStd 802.3-2008), Amendment 4: Media Access Control Parameters, Physical Layers, and Management Parameters for 40 Gb/s and 100 Gb/s Operation, Jun. 22, 2010, 427 pgs.
M Gustlin, P Anslow, and D Giannakopoulos, 100GE/40GE skew budget, Nov. 2008, 21 pgs., IEEE 802.3ba TF.
Gary Nicholl, 100GE and 40GE PCS Overview, Nov. 2008, 27 pgs., IEEE 802.3az Energy Efficient Ethernet Task Force public area.

* cited by examiner

*Primary Examiner* — Elias Mamo
(74) *Attorney, Agent, or Firm* — Okamoto & Benedicto LLP (57) ABSTRACT

One embodiment relates to a method for determining a latency of a FIFO buffer. A highest-order bit is provided from FIFO write and read counters to input-comparison logic that distinguishes between the highest-order write and read bits having a same logic level and the highest-order write and read bits having different logic levels. The occupancy level, and hence the latency, of the FIFO buffer is determined based on the output of the input-comparison logic. Another embodiment relates to a FIFO buffer having write and read counters that each have a length in bits that is one bit longer than is needed to address the FIFO buffer. Another embodiment relates to a method of tuning a latency of a FIFO buffer. Other embodiments and features are also disclosed.

20 Claims, 9 Drawing Sheets

DETERMINISTIC FIFO BUFFER

BACKGROUND

1. Technical Field

The present invention relates generally to electronic circuits for data communications and other applications.

2. Description of the Background Art

A first-in first-out (FIFO) buffer is commonly used in circuits for data communications and other applications. A write pointer (write counter) is typically used to point to the address in the FIFO buffer where the next word is to be written. Similarly, a read pointer (read counter) is typically used to point to the address in the FIFO buffer from which the next word to be read is obtained.

SUMMARY

One embodiment relates to a method for determining a latency of a FIFO buffer. A highest-order bit is provided from FIFO write and read counters to input-comparison logic that distinguishes between the highest-order write and read bits having a same logic level and the highest-order write and read bits having different logic levels. The occupancy level, and hence the latency, of the FIFO buffer is determined based on the output of the input-comparison logic. Another embodiment relates to a FIFO buffer having write and read counters that each has a length in bits that is one bit longer than is needed to address the FIFO buffer. Another embodiment relates to a method of tuning a latency of a FIFO buffer. Other embodiments and features are also disclosed.

DETAILED DESCRIPTION

Introduction

The present disclosure relates to apparatus and methods for providing a FIFO buffer with deterministic latency. The deterministic latency for the FIFO buffer is achieved by an efficient and accurate measurement of the occupancy of the FIFO buffer.

The presently-disclosed FIFO buffer circuit with deterministic latency may be useful for certain communication protocols, such the Common Public Radio Interface (CPRI) and the IEEE-1588 standard, for example. CPRI may be used for communications between the radio equipment control and the radio equipment in wireless base stations. IEEE-1588 is a timestamping protocol that may be used to synchronize clocks across a data network to very high precision.

The presently-disclosed FIFO buffer may also be useful for low latency applications. Since the depth of the FIFO can be determined with high accuracy, the depth can be adjusted with greater safety to a small number allowing for reduced total delay.

Exemplary Circuit Apparatus and Methods

Figure 1:
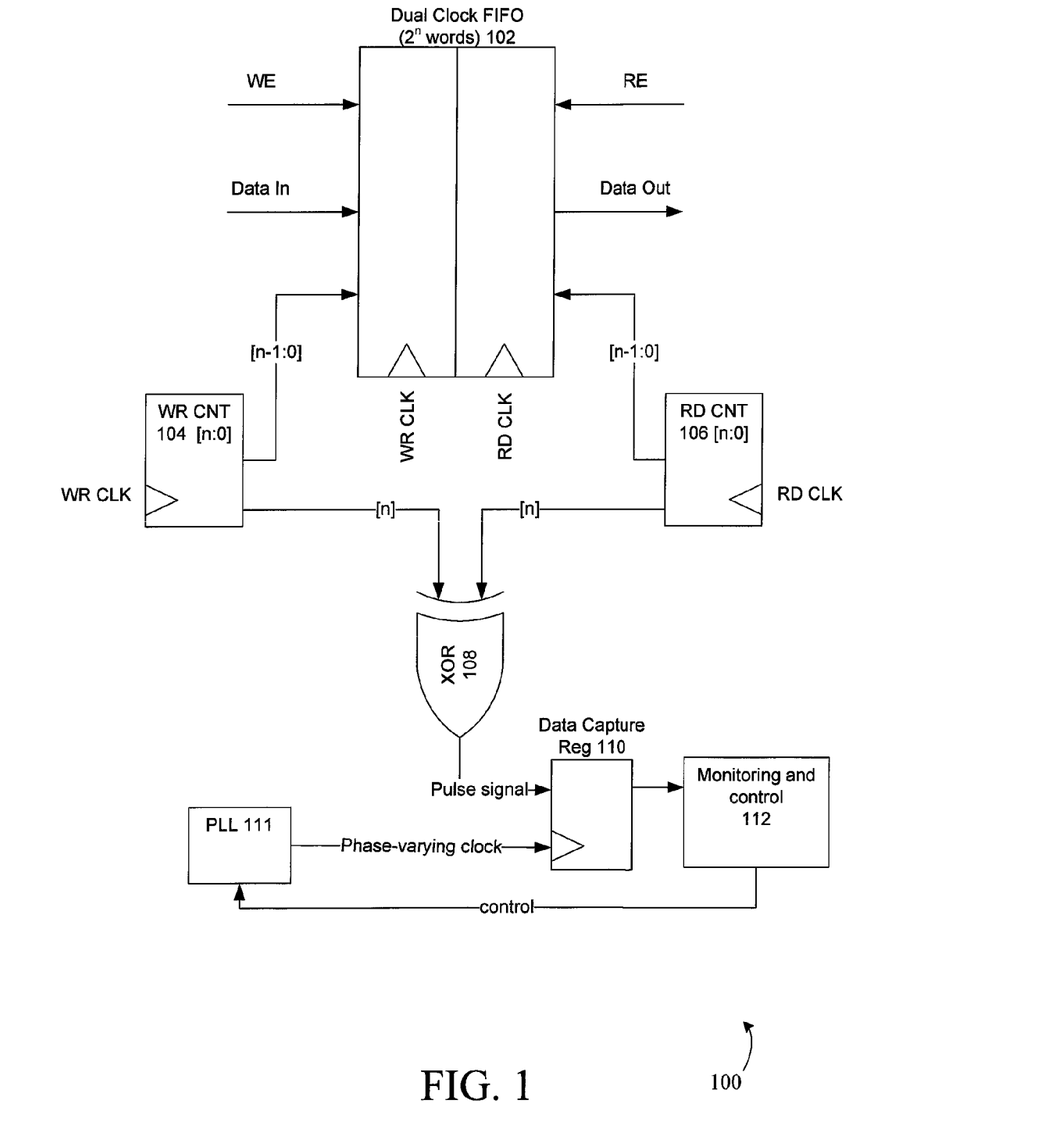
FIG. 1 is a diagram of an exemplary deterministic-latency buffer circuit in accordance with an embodiment of the invention.

FIG. 1 is a diagram of an exemplary deterministic-latency buffer circuit 100 in accordance with an embodiment of the invention. As shown, the buffer circuit 100 may include a dual-clock FIFO buffer 102, a write counter (WR CNT) 104, a read counter (RD CNT) 106, exclusive-or (XOR) logic circuit 108, data-capture register 110, phase-locked loop (PLL) 111, and monitoring and control logic 112.

The FIFO buffer 102 has a depth of $2^n$ data words, where n is a counting number. In other words, the depth of the FIFO buffer 102 may be 2 words, or 4 words, or 8 words, or 16 words, etc. The FIFO buffer 102 has a data in (DATA IN) port, a data out (DATA OUT) port, a write enable (WE) control input, a read enable (RE) control input, a write address (WR ADR) port, a read address (RD ADR) port, a write clock input (WR CLK), and a read clock input (RD CLK). The write and read enable control inputs allow data to be written or read, respectively, on only selective clock cycles. For example, data may be allowed to be written or read only on cycles with valid data in the "data valid" use case described below.

The write counter 104 has a length of n+1 bits: bit 0, bit 1, bit 2, . . . , bit n−1, and bit n. In other words, the length in bits of the write counter 104 is one plus the logarithm base 2 of the depth of the FIFO buffer. After each write of one word to the FIFO buffer 102, the write counter 104 is incremented by one to point to a next address of the FIFO buffer 102.

The lower-order n bits (i.e. bit n−1 through bit 0) of the read counter 104 are used for the write address (i.e. the FIFO address to which a word is to be written). The highest-order bit (i.e. bit n) of the write counter 104 is not needed for addressing. This is because the FIFO buffer 102 has a depth of $2^n$ words and so only needs the lower-order n bits to address. Nevertheless, in accordance with an embodiment of the invention, the highest-order bit of the write counter 104 is maintained. As described further below, the highest-order bit is output from the write counter 104 to a first input of the XOR logic circuit 108.

The read counter 106 also has a length of n+1 bits: bit 0, bit 1, bit 2, . . . , bit n−1, and bit n. In other words, the length in bits of the read counter 106 is one plus the logarithm base 2 of the depth of the FIFO buffer. After each read of one word from the FIFO buffer 102, the read counter 106 is incremented by one to point to a next address of the FIFO buffer 102.

The lower-order n bits (i.e. bit 0 through bit n−1) of the read counter 106 are used for the read address (i.e. the FIFO address from which a word is to be read). The highest-order bit (i.e. bit n) of the read counter 106 is not needed for addressing. This is because the FIFO buffer 102 has a depth of $2^n$ words and so only needs the lower-order n bits to address. Nevertheless, in accordance with an embodiment of the invention, the highest-order bit of the read counter 106 is maintained. As described further below, the highest-order bit is output from the read counter 106 to a second input of the XOR logic circuit 108.

The XOR logic circuit 108 receives the highest-order bits from the write counter 104 and the read counter 106 at its inputs. As shown, a pulse signal is output from the XOR logic circuit 108.

In the illustrated embodiment, the pulse signal may be received by a data-capture register (Data Capture Reg 110). The data-capture register 110 may read the pulse signal as data with a phase-varying clock, and a determination may be made as to whether the data capture register 110 captures a logical low signal or logical high signal.

In this embodiment, the duty cycle of the pulse signal may be determined by controllably varying the phase of the phase-varying clock signal (for example, over a predetermined range of phases) and monitoring the resultant data that is captured by the data-capture register 110. The variation of the phase may be accomplished by a control signal sent from the monitoring and control logic 112 to the PLL 111 that generates the phase-varying clock signal.

Because the duty cycle of the pulse signal is measured to indicate the occupancy of the FIFO buffer 102, the delay from each counter (104 and 106) to the XOR logic gate 108 should be delay matched or have a delay mismatch (i.e. a skew) that is known with high accuracy (for example, to an accuracy of 50 picoseconds to 100 picoseconds).

Figure 2:
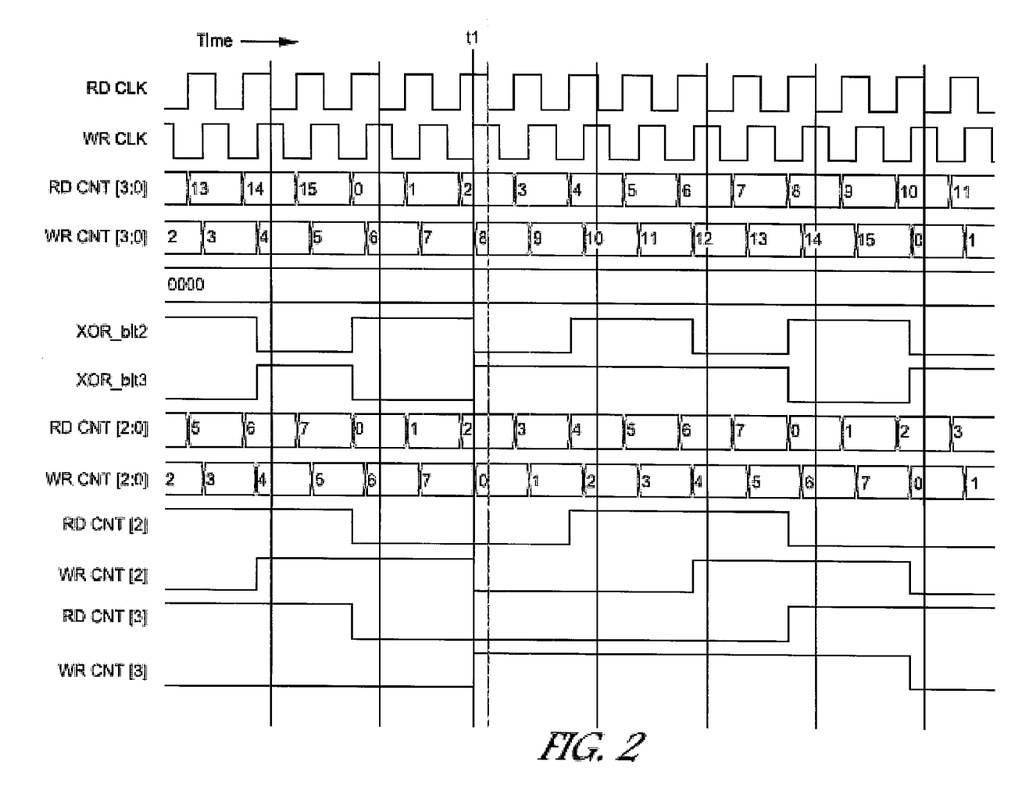
FIG. 2 is an example timing diagram for the exemplary circuit of FIG. 1 in accordance with an embodiment of the invention.

FIG. 2 is an example timing diagram for the exemplary circuit of FIG. 1 in accordance with an embodiment of the invention. For this example, n=3 such that the depth of the FIFO buffer is $2^3$=8 words, and the lengths of the write and read counters are both 3+1=4.

The example signals and data shown include: the read clock (RD CLK) signal; the write clock (WR CLK) signal; the read counter (RD CNT); the write counter (WR CNT) value. Also shown are: the exclusive-or of bit 2 of the read and write counters (XOR bit 2); the exclusive-or of bit 3 of the read and write counters (XOR bit 3); the value of the lower order 3 bits of the read counter (RD CNT [2:0]); the value of the lower order 3 bits of the write counter (WR CNT [2:0]); bit 2 of the read counter (RD CNT[2]); bit 2 of the write counter (WR CNT[2]); bit 3 of the read counter (RD CNT[3]); and bit 3 of the write counter (WR CNT[3]).

As seen, RD CLK and WR CLK are out of phase with each other. In this example, the RD CNT is approximately 5.75 behind the WR CNT.

XOR bit 2 creates a pulse signal that has a cycle that is approximately four clock cycles long. The duty cycle of XOR bit 2 provides some information as to the occupancy level of the FIFO buffer. However, the duty cycle of the XOR bit 2 signal is unable to distinguish between a FIFO occupancy of X and a FIFO occupancy of 8−X. For example, a duty cycle of 2.25 out of 4 clock cycles for XOR bit 2 may indicate a FIFO occupancy of either 2.25 of 8 words or 5.75 of 8 words.

XOR bit 3 is a pulse signal that has a cycle that is approximately eight clock cycles long. As disclosed herein, the duty cycle of XOR bit 3 correctly indicates the occupancy level of the FIFO buffer. In the illustrated example, the duty cycle of XOR bit 3 is approximately 5.75 clock cycles of 8 clock cycles. This indicates unambiguously that the occupancy of the FIFO buffer is 5.75 words out of the maximum occupancy of 8 words.

In order to generate the XOR bit 3 signal, the read and write counters must have an additional bit beyond the bits needed to address the FIFO buffer. In this example, while RD CNT [2:0] and WR CNT [2:0] are sufficient to address the FIFO buffer, the read and write counters include bit 3 (an additional highest-order bit) for use in generating the XOR bit 3 signal.

Figure 3:
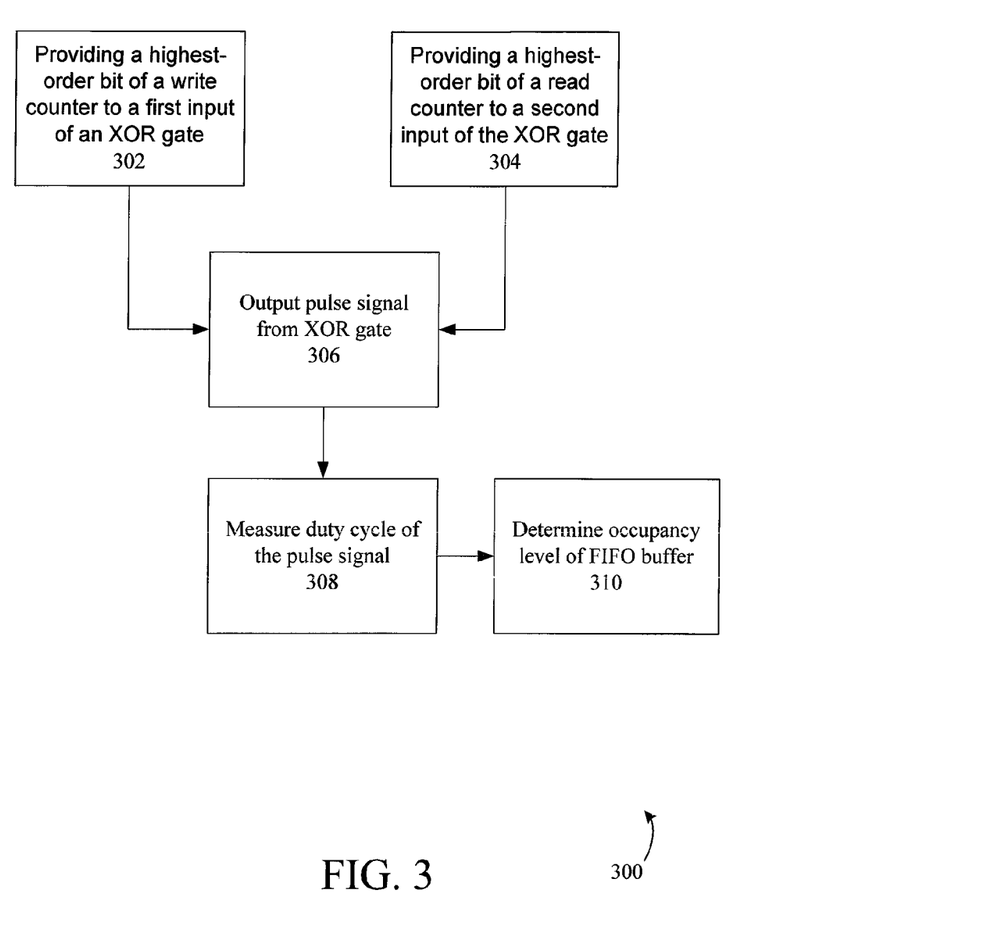
FIG. 3 is a flow chart of a method for measuring an occupancy level of a FIFO buffer using the circuit of FIG. 1 in accordance with an embodiment of the invention.

FIG. 3 is a flow chart of a method 300 for measuring an occupancy level of a FIFO buffer using the exemplary circuit of FIG. 1 in accordance with an embodiment of the invention. Per block 302, the highest-order bit is provided from a read counter to a first input of an exclusive-or logic gate. This bit may be referred to as the "highest-order read bit". Similarly, per block 304, the highest-order bit is provided from a write counter to a second input of the exclusive-or logic gate. This bit may be referred to as the "highest-order write bit". For example, if n=3 such that the FIFO buffer has a depth of 8 words, then the highest-order read bit from the read counter is RD CNT[3], and the highest-order write bit from the write counter is WR CNT[3].

Per block 306, a pulse signal is output from the exclusive-or logic gate. For example, if n=3 such that the FIFO buffer has a depth of 8 words, then the pulse signal is given by XOR (RD CNT[3], WR CNT[3]).

Per block 308, a duty cycle of the pulse signal is measured. In one implementation, the duty cycle of the pulse signal may be measured by sweeping a phase-varying clock signal across a range of phases under control of monitoring and control logic. Each phase step during the sweep may be a short interval, such as 100 picoseconds, for example. The phase-varying clock signal may be provided to a clock input of a data-capture register that receives the pulse signal at its data input. The data-capture register outputs a data signal to the monitoring and control logic, and the monitoring and control logic may then process the data signal to determine the duty cycle by finding the phase locations of the transitions in the pulse signal.

Per block 310, the duty cycle may be used by the monitoring and control logic to determine an occupancy level of the first-in-first-out buffer. For example, if the duty cycle is X clock cycles out of a maximum of 8 clock cycles, then the occupancy level may be determined to be X words out of a maximum depth of 8 words.

Figure 4:
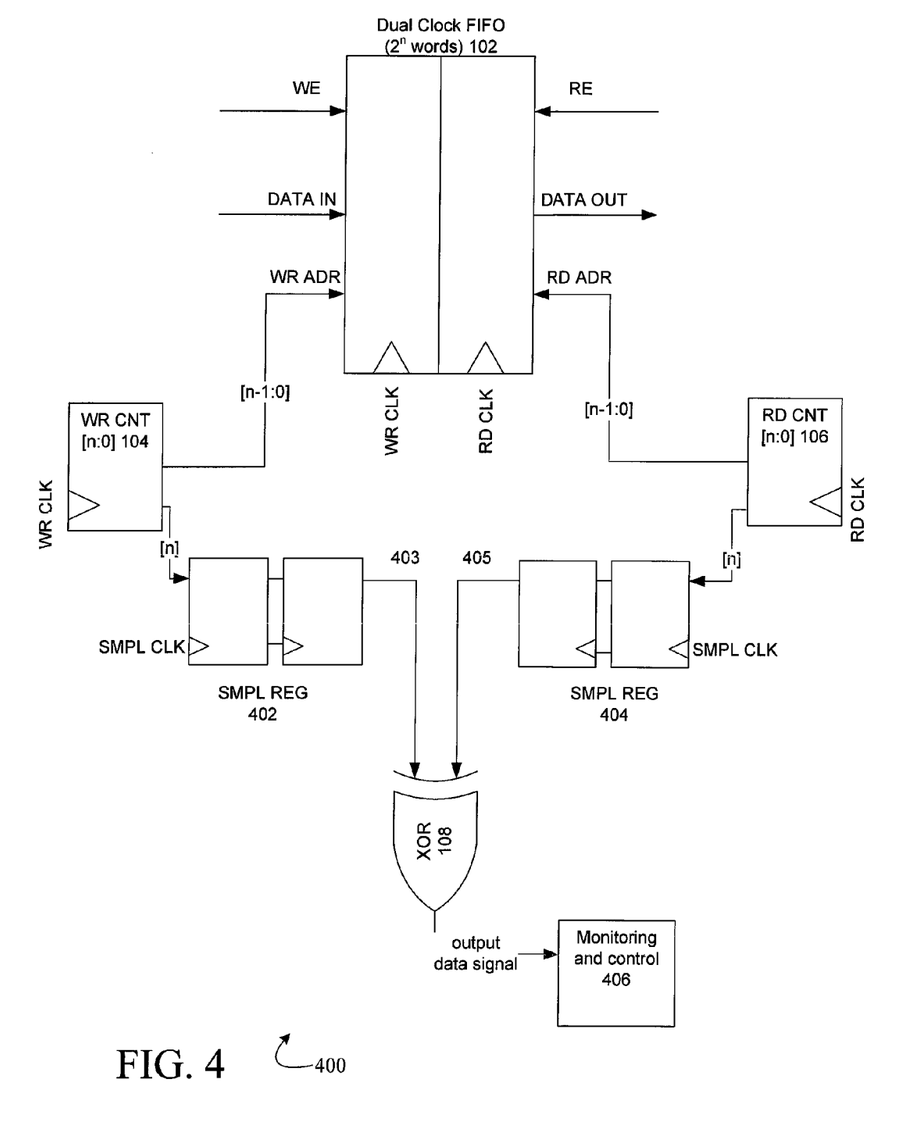
FIG. 4 is a diagram of an exemplary deterministic-latency buffer circuit in accordance with another embodiment of the invention.

FIG. 4 is a diagram of an exemplary deterministic-latency buffer circuit 400 in accordance with another embodiment of the invention. The circuit 400 in FIG. 4 is similar to the circuit 100 of FIG. 1 with the addition of a sampling register (402 and 404) between each counter and the XOR logic gate 108 and monitoring and control logic 406. In particular, a first sampling register (SMPL REG 402) is arranged between the write counter (WR CNT 104) and the XOR logic gate 108, and a second sampling register (SMPL REG 404) is arranged between the read counter (RD CNT 106) and the XOR logic gate 108. The monitoring and control logic 406 may receive the output data signal from the XOR logic gate 108.

The first and second sampling registers (402 and 404) are preferably meta-stable hardened sampling registers. For example, each sampling register may be made using a pair of flip-flops in series, as depicted in FIG. 4.

The first sampling register 402 may sample the highest-order bit (bit n) from the write counter 104 to generate a first sampled signal 403. The first sampled signal 403 may be output from the first sampling register 402 to the first input of the XOR logic gate 108. Similarly, the second sampling register 404 may sample the highest-order bit (bit n) from the read counter 106 to generate a second sampled signal 405. The second sampled signal 405 may be output from the second sampling register 404 to the second input of the XOR logic gate 108.

The XOR logic gate 108 may output a digital output signal to monitoring and control logic 406. The monitoring and control logic 406 may controllably vary the phase of SMPL CLK such that the phase is swept across a predetermined range of phases. The monitoring and control logic 406 may process the resultant output signals to determine an average occupancy level of the FIFO buffer 102. In one implementation, the monitoring and control logic 406 may be implemented by electronically-programmed circuitry (for example, in a core of a field programmable gate array). In another implementation, the monitoring and control logic 406 may be implemented using hard-wired circuitry.

Because the highest-order bits are sampled before being input to the XOR logic gate 108, the delays to the XOR logic gate 108 do not need to be matched (or to have an accurately known mismatch or skew). Instead, it is merely necessary to match (or to accurately know the mismatch of) the delays from each counter (104 and 106) to the respective sampling register (402 and 404, respectively). In addition, the sampling clock (SMPL CLK) is preferably balanced (delay matched to the sampling registers 402 and 404). Such delay matching may generally be accomplished with standard place-and-route technology.

Figure 5:
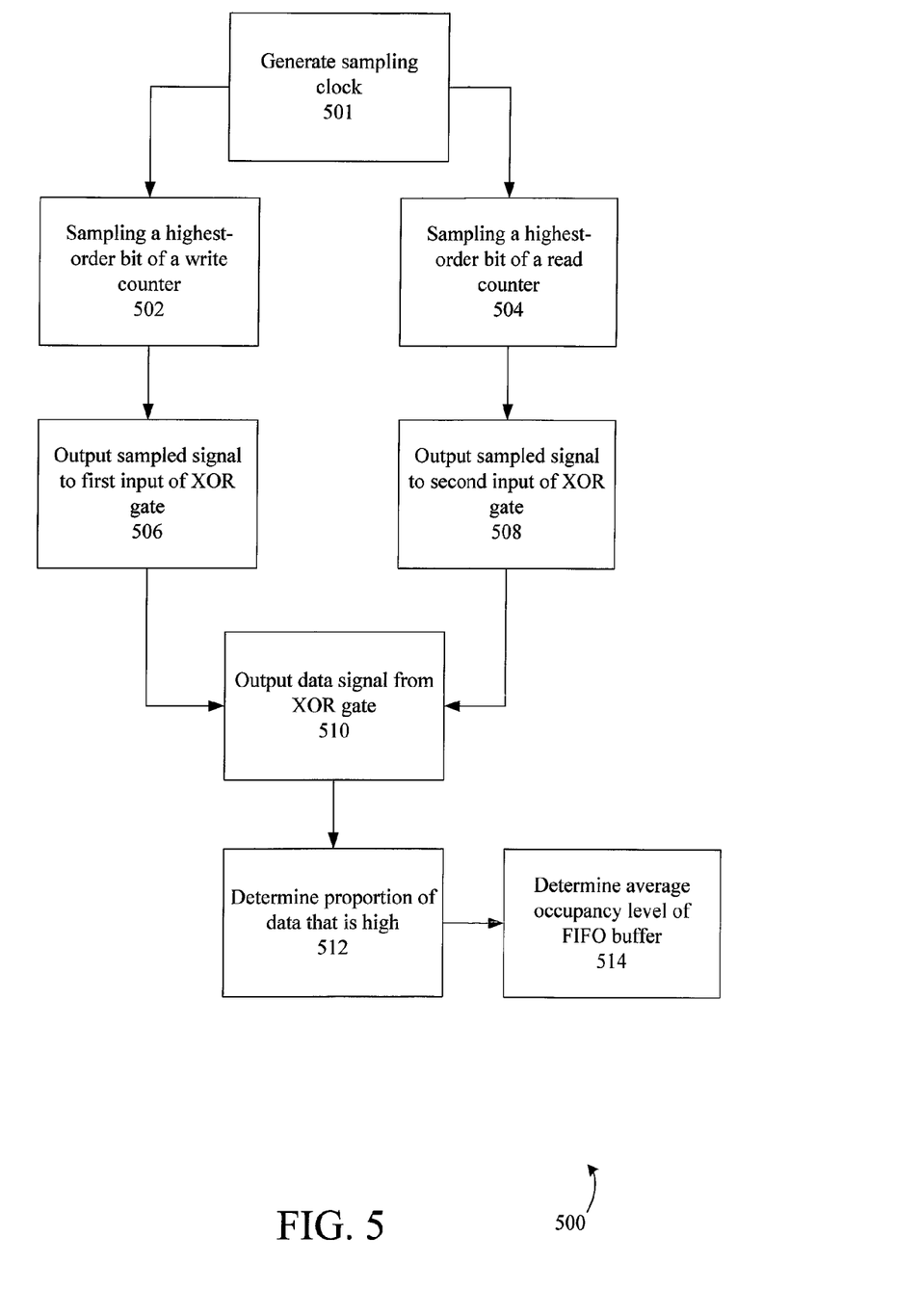
FIG. 5 is a flow chart of a method for measuring an occupancy level of a FIFO buffer using the exemplary circuit of FIG. 4 in accordance with an embodiment of the invention.

FIG. 5 is a flow chart of a method 500 for measuring an occupancy level of a FIFO buffer using the exemplary circuit of FIG. 4 in accordance with an embodiment of the invention. This method 500 advantageously uses the sampling registers of FIG. 4

Per block 501, a sampling clock signal may be generated by a phase-locked loop. The sampling clock signal has a frequency that is different from that of the write and read clock signals of the FIFO buffer. In one embodiment, the sampling clock signal may be selected to have a small greatest common divisor relative to the write and read clocks. This allows the sampling registers to obtain a well-distributed sampling of the highest-order write and read bit signals.

Per block 502, a first sampling register samples the highest-order bit from the read counter ("the highest-order read bit") using a sampling clock signal. Per block 504, a second sampling register samples the highest-order bit from the write counter ("the highest-order write bit") using the sampling clock signal. Blocks 502 and 504 are performed in parallel (i.e. at a same time), and the sampling clock signal is preferably delay matched to the first and second sampling registers. In addition, the first and second sampling registers may be implemented as meta-stable hardened registers.

Per block 506, the sampled signal obtained by the first sampling register ("the first sampled signal") may be output from the first sampling register to the first input of the XOR gate. Per block 508, the sampled signal obtained by the second sampling register ("the second sampled signal") may be output from the second sampling register to the second input of the XOR gate. Blocks 506 and 508 may be performed in parallel (i.e. at a same time).

Subsequently, per block 510, the XOR gate may output a data signal that is the result of applying an exclusive-or logic operation to the first and second inputs. If the first and second sampled signals are both high or both low, then the output data signal will be low. Otherwise, if one of the sampled signals is high and the other is low, then the output data signal will be high.

Per block 512, the output data signal may be processed by monitoring and control logic to determine the proportion of the output data signal that is high (versus low). Per block 514, the average occupancy of the FIFO buffer may be determined from the proportion of the output data signal that is high (versus low). For example, if the output data signal is 55% high and 45% low, then the average occupancy of the FIFO buffer may be determined to be 55% of the depth of the FIFO buffer. For instance, if the FIFO depth is eight words, then the average occupancy may be determined to be 8 words×55%=4.4 words.

It is noted that while the above embodiments describe use of an XOR logic gate 108, an alternate embodiment may use an XNOR (exclusive-nor) logic gate in place of the XOR logic gate 108. In such an alternate embodiment, an inverter may be provided at the output of the XNOR logic gate, or the monitoring and control logic 112 may be appropriately reversed so that the same overall functionalities are provided.

More generally, input-comparison logic may be used in place of the XOR logic gate 108, where the input-comparison logic distinguishes between the highest-order write and read bits having a same logic level and the highest-order write and read bits having different logic levels. As discussed above, the input-comparison logic may be implemented using an XOR logic gate 108 or using an XNOR logic gate.

Use as Phase-Comp FIFO

In one embodiment, the presently-disclosed FIFO buffer circuit with deterministic latency may be used as a phase-compensation (phase comp) FIFO. Such a phase comp FIFO may have read and write clocks having the same (identical) frequency. However, the read and write clocks of the phase comp FIFO may be considered to have, for practical purposes, an arbitrary phase relationship.

For example, clock signals for different clock domains may be distributed within the integrated circuit differently and so may have substantially different clock insertion delays due to process-voltage-temperature (PVT) variations. For this reason, the boundary between clock domains may be crossed with phase comp FIFO buffers. The phase comp FIFO buffers may be arranged to advantageously move data across the clock domain boundary regardless of phase, but the FIFO buffers introduce latencies into the transmit and receive paths. A capability to determine those latencies is advantageous. For example, such a determination of those latencies may enable accurate timestamping of outgoing and incoming packets.

"Data Valid" Use Case

In one embodiment, the presently-disclosed FIFO buffer circuit with deterministic latency may be used to buffer data between two clock domains. As explained below, one of the two clock domains may be a "data valid" clock domain.

Figure 6:
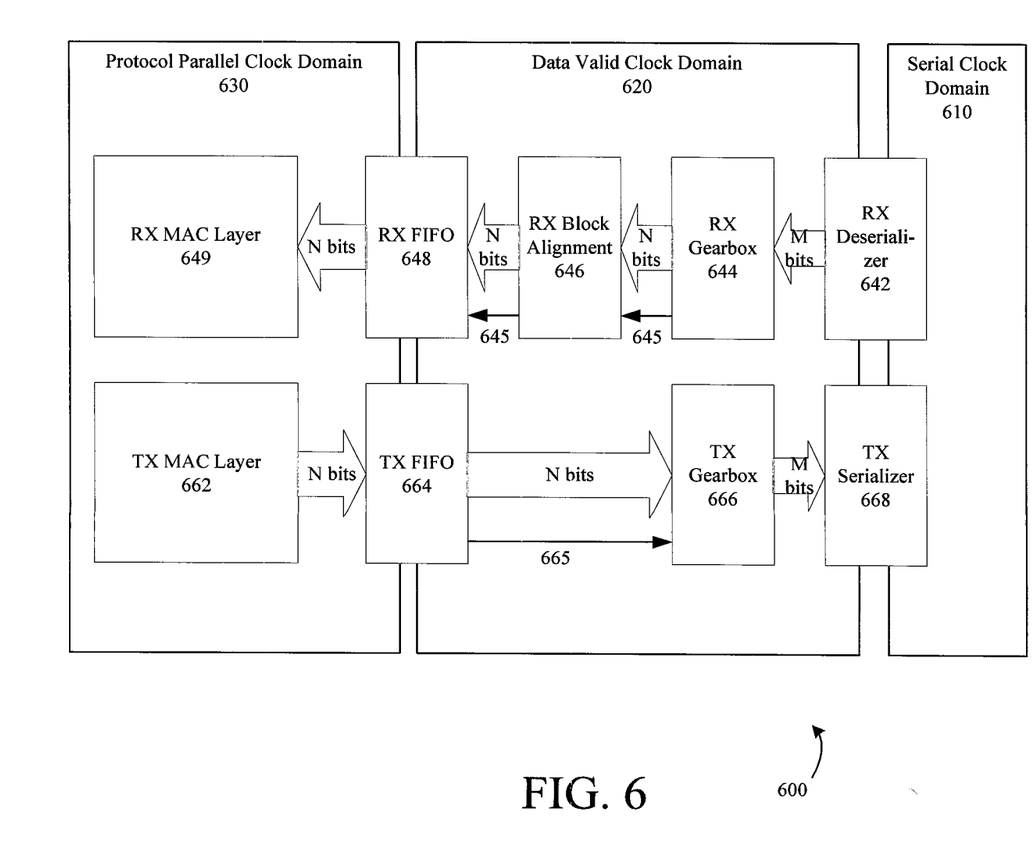
FIG. 6 depicts an exemplary transceiver within which an embodiment of the invention may be implemented as a phase-compensation FIFO buffer.

Consider, for example, the multiple clock domains in the exemplary transceiver depicted in FIG. 6. As shown, the multiple clock domains may include a serial clock domain 610, a data valid (intermediate) clock domain 620, and a protocol parallel clock domain 630. In one example, the serial clock domain 610 may have a high clock frequency, the data valid clock domain 620 may have an intermediate clock frequency that is lower than the high clock frequency, and the protocol parallel clock domain 630 may have a low clock frequency that is lower than the intermediate clock frequency.

In the receiver (RX) path, the RX deserializer circuit 642 converts the serial bitstream in the serial clock domain 610 to an M-bit-wide parallel bitstream in the data valid clock domain 620. The RX (M-to-N) gearbox circuit 644 converts the M-bit word to an N-bit word, where N is greater than M. For example, M may be forty, and N may be sixty-six. M and N may be other numbers in other implementations.

Since N is greater than M, the RX gearbox circuit 644 does not have enough data bandwidth coming in to provide a wider word (N-bits wide) every cycle. As such, the RX gearbox circuit 644 also outputs a data valid signal 645. For the M-to-N gearbox 644, the data valid signal 645 is asserted M times in a cycle of N clock periods. In other words, during a period of N clock cycles, the data valid signal is asserted during M clock cycles and de-asserted during (N-M) clock cycles. For example, if M=40 and N=66, then the RX 40-66 gearbox, and the data valid signal 645 is asserted twenty times in a cycle of thirty-three clock periods.

The RX block alignment circuit 646 determines the block boundaries and aligns the received data to those block boundaries. The block boundary may be determined, for example, by searching for a multi-bit header for an N-bit block. The aligned N-bit blocks are transferred to the RX FIFO buffer 648. The RX block alignment circuit 646 also passes the data valid signal 645 to the RX FIFO buffer 648, where the data at the higher clock rate is moved to a lower frequency (the serial rate divided by the protocol's data width) without a valid signal (i.e. with the data being valid every clock cycle).

The RX FIFO buffer 648 serves as a clock-crossing bridge from the data valid clock domain 620 to the protocol parallel clock domain 630. The RX FIFO buffer 648 may have a depth of $D_R$ blocks (words). For example, the depth may be eight blocks (i.e. $D_R=8$). More generally, the depth may be $D_R=2^n$, where n is a counting number.

The RX MAC circuitry 649 operates in the protocol parallel clock domain 630. The RX MAC circuitry 649 receives the N-bit-wide data blocks (words) output by the RX FIFO 648 and processes the received data in accordance with MAC layer requirements.

In the transmit (TX) path, the TX MAC circuitry 662 operates in the protocol parallel clock domain 630. The TX MAC circuitry 662 processes the data to be transmitted in accordance with MAC layer requirements and provides the N-bit data blocks to the TX FIFO buffer 664.

The TX FIFO buffer 664 serves as a clock-crossing bridge from the protocol parallel clock domain 630 to the data valid clock domain 620. The TX FIFO buffer 664 may have a depth of $D_T$ blocks (words). For example, the depth may be eight blocks (i.e. $D_T=8$). More generally, the depth may be $D_T=2^n$, where n is a counting number.

Upon assertion of a data valid signal 665, the TX (N-to-M) gearbox circuit 666 may receive the N-bit word and convert it to an M-bit word, where N is greater than M as discussed above in relation to the RX gearbox circuit 644. The TX serializer circuit 668 converts the M-bit-wide parallel bitstream in the data valid clock domain 620 to a serial bitstream in the serial clock domain 610.

FIFO Latency Tuning

Figure 7:
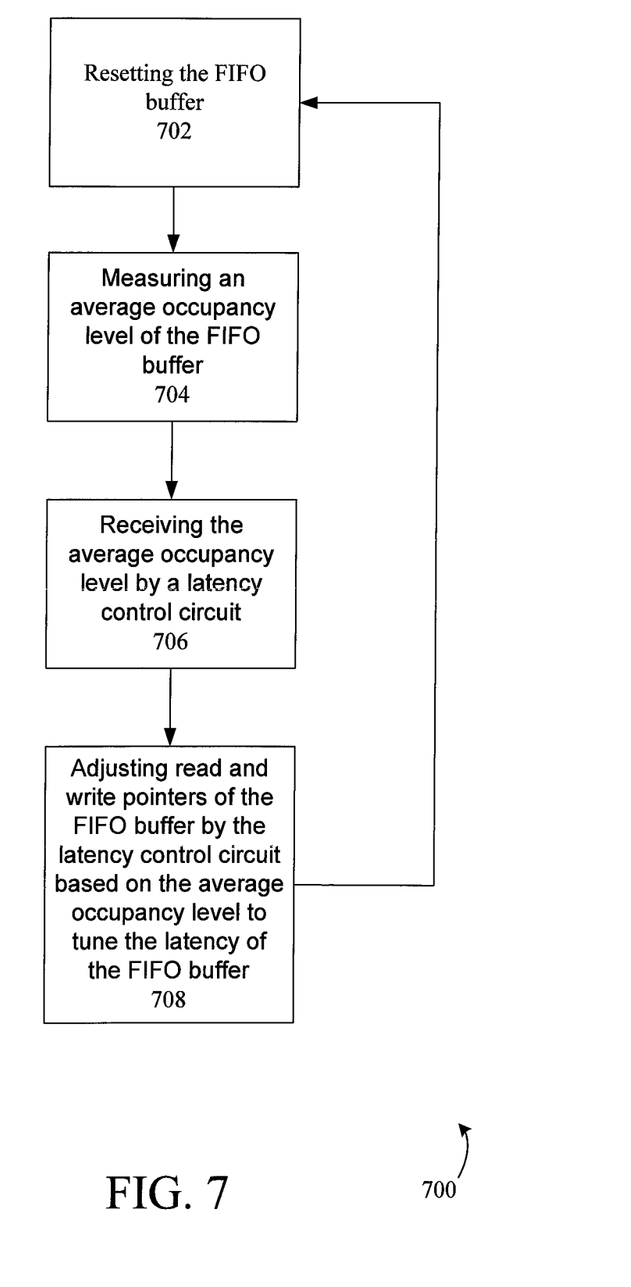
FIG. 7 is a flow chart of a method of tuning a latency of a FIFO buffer in accordance with an embodiment of the invention.

FIG. 7 is a flow chart of a method 700 of tuning a latency of a FIFO buffer in accordance with an embodiment of the invention. Per block 702, the FIFO buffer may be reset. Thereafter, per block 704, an average occupancy level of the FIFO buffer may be measured. Per block 706, this average occupancy level may be received by a latency control circuit. Finally, per block 708, read and write pointers of the FIFO buffer may be adjusted by the latency control circuit based on the average occupancy level to adjust the latency of the FIFO buffer.

As indicated in the flow chart, the method 700 may be performed iteratively. In an exemplary implementation, blocks 702 through 708 may be performed iteratively in a tuning loop to minimize the latency of the FIFO buffer.

Exemplary FPGA and Digital System

Figure 8:
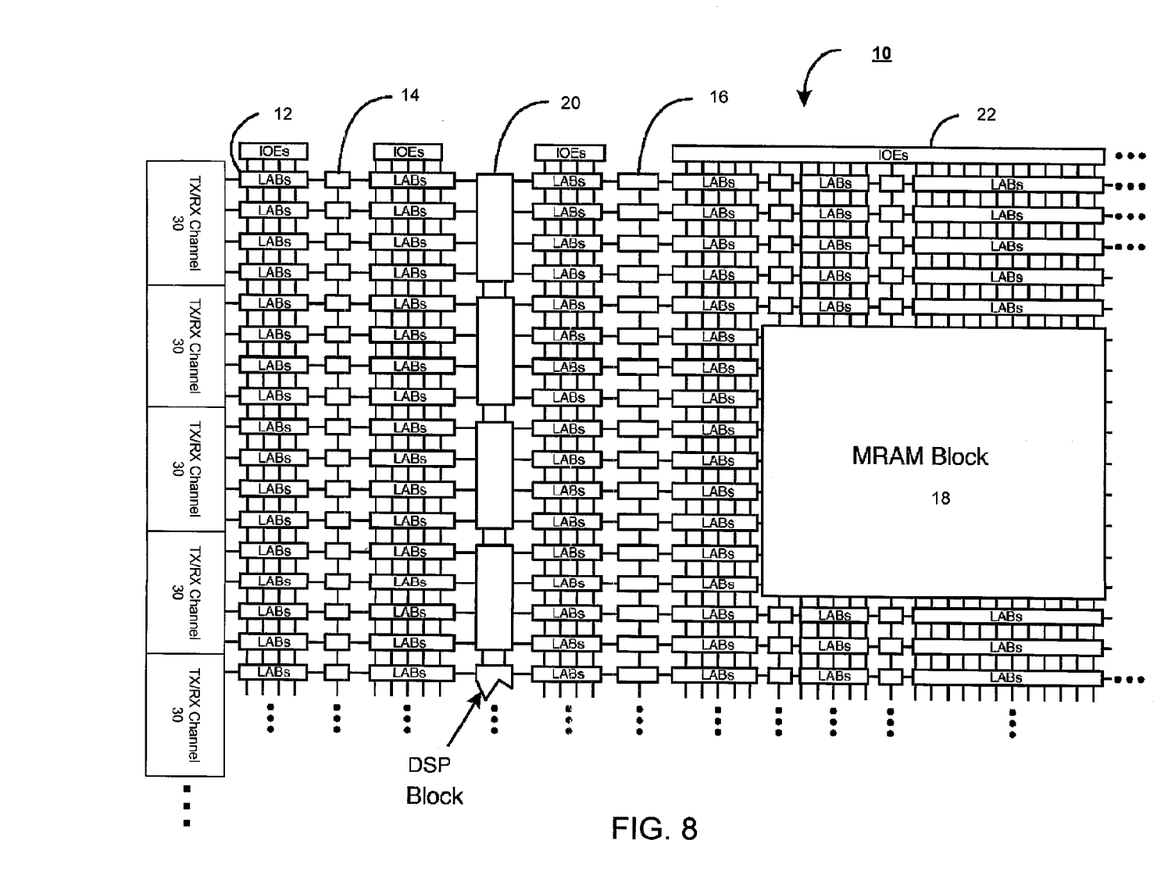
FIG. 8 is a simplified partial block diagram of a field programmable gate array (FPGA) including transceiver circuits within which the apparatus and methods disclosed herein may be implemented in accordance with an embodiment of the invention.

FIG. 8 is a simplified partial block diagram of a field programmable gate array (FPGA) 10 including transceiver circuits within which the apparatus and methods disclosed herein may be implemented in accordance with an embodiment of the invention. It should be understood that embodiments of the present invention can be used in numerous types of integrated circuits such FPGAs, programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the circuitry described herein.

It is to be understood that FPGA 10 is described herein for illustrative purposes only and that the present invention can be implemented in many different types of PLDs, FPGAs, and ASICs.

Figure 9:
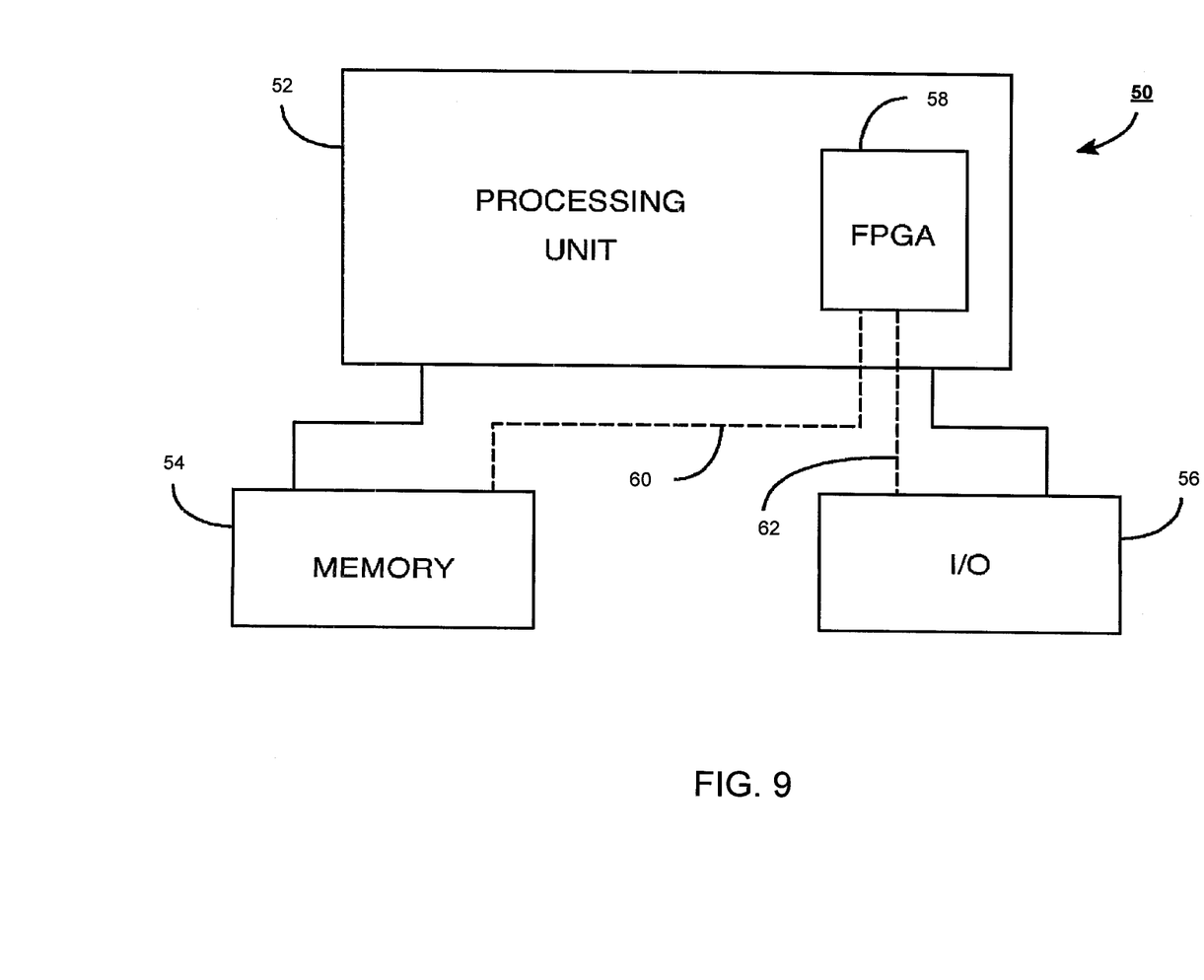
FIG. 9 is a block diagram of an exemplary digital system within which the apparatus and methods disclosed herein may be utilized in accordance with an embodiment of the invention.

The present invention can also be implemented in a system that has an FPGA as one of several components. FIG. 9 is a block diagram of an exemplary digital system 50 within which the apparatus and methods disclosed herein may be utilized in accordance with an embodiment of the invention.

System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for determining an average latency of a first-in-first-out buffer, the method comprising:
    applying input-comparison logic to a first input comprising a highest-order read bit from a read counter and a second input comprising a highest-order write bit from a write counter, wherein the input-comparison logic differentiates between the first and second inputs having a same logic level and the first and second inputs having different logic levels;
    generating an output signal by the input-comparison logic; and
    determining an occupancy level of the first-in-first-out buffer based on the output signal from the input-comparison logic,
    wherein a delay difference is known between a first signal delay from the read counter to the input-comparison logic and a second signal delay from the write counter to the input-comparison logic, and wherein said delay difference is used in determining the occupancy level.

2. The method of claim 1, wherein the input-comparison logic comprises an exclusive-or logic gate.

3. The method of claim 1, wherein the input-comparison logic comprises an exclusive-nor logic gate.

4. The method of claim 1, wherein a counter length in bits of the read and write counters is one bit larger than is needed to address the first-in-first-out buffer.

5. The method of claim 4, wherein the first-in-first-out buffer has a buffer depth in words that is a power of two, and wherein the counter length in bits is one plus a logarithm base two of the buffer depth.

6. The method of claim 1, wherein a first signal delay from the read counter to the input-comparison logic is matched to a second signal delay from the write counter to the input-comparison logic.

7. The method of claim 1, wherein determining the occupancy level comprises:
    generating a phase-varying clock signal under control of monitoring and control logic;
    receiving the output signal at a data input of a data-capture register and the phase-varying clock signal at a clock input of the data-capture register; and
    receiving a data signal from the data-capture register by the monitoring and control logic.

8. The method of claim 7, further comprising:
    sweeping a phase of the phase-varying clock signal across a range of phases.

9. A method for determining an average latency of a first-in-first-out buffer, the method comprising:
    applying input-comparison logic to a first input comprising a highest-order read bit from a read counter and a second input comprising a highest-order write bit from a write counter, wherein the input-comparison logic differentiates between the first and second inputs having a same logic level and the first and second inputs having different logic levels;
    generating an output signal by the input-comparison logic;
    determining an occupancy level of the first-in-first-out buffer based on the output signal from the input-comparison logic;
    generating a sampling clock signal using a phase-locked loop;
    sampling the highest-order read bit from the read counter with a first sampling register using sampling clock signal;
    sampling the highest-order write bit from the write counter with a second sampling register using the sampling clock signal;
    outputting a first sampled signal from the first sampling register to the first input of the input-comparison logic; and
    outputting a second sampled signal from the second sampling register to the second input of the input-comparison logic.

10. The method of claim 9, wherein the first and second sampling registers comprise meta-stable hardened circuits.

11. The method of claim 9, wherein a first signal delay from the read counter to the first sampling register is matched to a second signal delay from the write counter to the second sampling register, and the sampling clock signal is delay balanced to the first and second sampling registers.

12. The method of claim 9, wherein a delay difference is known between a first signal delay from the read counter to the first sampling register is matched to a second signal delay from the write counter to the second sampling register, and the sampling clock signal is delay balanced to the first and second sampling registers, and wherein said delay difference is used in determining the occupancy level.

13. The method of claim 9, wherein the sampling clock signal has a frequency that is different from that of write and read clock signals of the first-in-first-out buffer.

14. A circuit comprising:
a read counter for a first-in-first-out buffer, wherein the read counter has a counter length in bits that is one bit longer than is needed to address the first-in-first-out buffer;
a write counter for the first-in-first-out buffer, wherein the write counter has a counter length in bits that is one bit longer than is needed to address the first-in-first-out buffer; and
input-comparison logic comprising first and second inputs and an output, wherein the input-comparison logic differentiates between the first and second inputs having a same logic level and the first and second inputs having different logic levels,
wherein the first input of the input-comparison logic receives a highest-order read bit from the read counter, the second input of the input-comparison logic receives the highest-order write bit from the write counter, and the output of the input-comparison logic provides an output signal.

15. The circuit of claim 14, further comprising:
the first-in first-out buffer which has a buffer depth, wherein the buffer depth in words is a power of two, and the counter length in bits of the read counter and the counter length in bits of the write counter are each one plus a logarithm base two of the buffer depth in words.

16. The circuit of claim 14, wherein a first signal delay from the read counter to the input-comparison logic is matched to a second signal delay from the write counter to the input-comparison logic.

17. A method for determining an average latency of a first-in-first-out buffer, the method comprising:
applying input-comparison logic to a first input comprising a highest-order read bit from a read counter and a second input comprising a highest-order write bit from a write counter, wherein the input-comparison logic differentiates between the first and second inputs having a same logic level and the first and second inputs having different logic levels;
generating an output signal by the input-comparison logic;
determining an occupancy level of the first-in-first-out buffer based on the output signal from the input-comparison logic; and
measuring a duty cycle of the output signal,
wherein the duty cycle of the output signal is measured by measurement circuitry which comprises:
a phase-locked loop for generating a phase-varying clock signal; and
a data-capture register receiving the output signal at a data input and the phase-varying clock signal at a clock input.

18. The method of claim 17, wherein the measurement circuitry further comprises:
monitoring and control logic that receives a data signal from the data-capture register and controls the phase of the phase-varying clock signal using the data signal.

19. A method for determining an average latency of a first-in-first-out buffer, the method comprising:
applying input-comparison logic to a first input comprising a highest-order read bit from a read counter and a second input comprising a highest-order write bit from a write counter, wherein the input-comparison logic differentiates between the first and second inputs having a same logic level and the first and second inputs having different logic levels;
generating an output signal by the input-comparison logic;
determining an occupancy level of the first-in-first-out buffer based on the output signal from the input-comparison logic, wherein the occupancy level comprises an average occupancy level;
resetting the first-in-first-out buffer before determining the average occupancy level;
receiving the average occupancy level by a latency control circuit; and
adjusting read and write pointers of the first-in-first-out buffer by the latency control circuit based on the average occupancy level to adjust the latency of the first-in-first-out buffer.

20. The method of claim 19, wherein the method is performed iteratively in a tuning loop to minimize the latency of the FIFO buffer.

* * * * *